United States Patent [19]
Tabe

[11] Patent Number: 5,662,197
[45] Date of Patent: Sep. 2, 1997

[54] BICYCLE ROLLER CLUTCH

[75] Inventor: Koshi Tabe, Sakai, Japan

[73] Assignee: Shimano, Inc., Osaka, Japan

[21] Appl. No.: 539,199

[22] Filed: Oct. 4, 1995

[30] Foreign Application Priority Data

Oct. 12, 1994 [JP] Japan ................................ 6-273055

[51] Int. Cl.$^6$ .................................................. F16D 41/06
[52] U.S. Cl. ............................ 192/64; 192/45; 188/82.84
[58] Field of Search .................. 192/64, 45; 188/82.84, 188/82.1

[56] References Cited

U.S. PATENT DOCUMENTS

| | | | |
|---|---|---|---|
| 2,044,197 | 6/1936 | Barthel | 192/45 |
| 2,079,528 | 5/1937 | Richardson | 192/45 |
| 2,096,438 | 10/1937 | Rockwell | 192/45 |
| 3,779,550 | 12/1973 | Rist | 192/45 |
| 3,799,306 | 3/1974 | Rist | 192/45 |
| 4,089,395 | 5/1978 | Fogelberg | 192/45.1 |
| 4,347,921 | 9/1982 | Bordes | 192/45.1 |
| 4,494,636 | 1/1985 | Wakabayashi et al. | 192/45.1 |
| 5,070,977 | 12/1991 | Lederman | 192/45 |
| 5,101,946 | 4/1992 | Lederman | 192/45 |
| 5,129,711 | 7/1992 | Chen | 301/105 B |
| 5,454,458 | 10/1995 | Ito | 192/45.1 |

FOREIGN PATENT DOCUMENTS

| | | | |
|---|---|---|---|
| 0 135 288 | 3/1985 | European Pat. Off. | F16D 41/06 |
| 1935063 | 1/1971 | Germany . | |
| 2236977 | 2/1973 | Germany | F16D 41/06 |
| 859556 | 1/1961 | United Kingdom . | |
| 1 370 502 | 10/1974 | United Kingdom | F16D 41/06 |

OTHER PUBLICATIONS

European Search Report for EP 95 30 7124, dated Jan. 17, 1996.

*Primary Examiner*—Andrea L. Pitts
*Attorney, Agent, or Firm*—James A. Deland

[57] ABSTRACT

A one-way clutch includes an internal rotary member and an external rotary member, wherein a surface of the internal rotary member and a surface of the external rotary member define a clutch member space so that a width of the clutch member space varies from a wider portion to a narrower portion. A clutch member is disposed in the clutch member space so that (i) relative rotation between the internal rotary member and the external rotary member is inhibited when the clutch member is disposed in the narrower portion of the clutch member space; and (ii) relative rotation between the internal rotary member and the external rotary member is allowed when the clutch member is disposed in the wider portion of the clutch member space. A clutch member support is provided for supporting the clutch member within the clutch member space, and a coupling member is provided for increasing a coupling force between the clutch member support and one of the internal rotary member or external rotary member when the clutch rotates in a drive direction.

20 Claims, 2 Drawing Sheets

BICYCLE ROLLER CLUTCH

BACKGROUND OF THE INVENTION

The present invention is directed to one-way clutches and, more particularly, to a bicycle roller clutch used for transmitting force to a bicycle wheel.

A one-way rotation clutch comprising a roller or pawl system has been used for the freewheels of the drive-side wheels on bicycles. As shown in FIG. 5, a known roller clutch 30 has a plurality of rollers 31 which are fitted into and supported by roller supports 32 so that they are in rolling contact around the outside surface of a cone 33. A cup 35 has grooves 36, whose radius increases circumferentially in a successive and linear fashion in a drive direction of the clutch (indicated by an arrow). Clutch 30 is designed such that each individual roller 31 is biased by a compressed coil spring 34 fixed to a roller support 32 toward the narrow side of the groove 36. When the clutch rotates in the drive direction, the rollers 31 move further into the narrow side of the grooves 36 so that the frictional force between the rollers 31, the cone 33 and the cup 35 cause the cone 31 and the cup 35 to rotate as a unit. When driving force is released, the rollers 31 move toward the wider side of the grooves 36, thus allowing the cone 33 and the cup 35 to rotate relative to each other (known as freewheeling).

An advantage of a roller clutch system such as this is that a secure lock can be achieved even if there are dimensional errors in the rollers, dimensional errors in the cup grooves, or dimensional errors in the cone. Furthermore, the noise inherent in traditional pawl clutch arrangements is eliminated. However, there is a disadvantage in that the biasing force of the springs 34 must be large in order to provide quick operation of the clutch. This large biasing force causes added friction between the rollers 31, the cone 33 and the cup 35 to cause an increase in torque during freewheeling when the cup 35 is unloaded. This, in turn, causes an undesirable dragging action on the chain and increasing wear on the components.

SUMMARY OF THE INVENTION

The present invention is directed to a roller clutch which efficiently and effectively couples an internal rotary member to an external rotary member when the clutch is rotating in a drive direction while decreasing frictional force between the internal rotary member and the external rotary member during freewheeling. In one embodiment of the present invention, a one-way clutch comprises an internal rotary member and an external rotary member, wherein a surface of the internal rotary member and a surface of the external rotary member define a clutch member space so that a width of the clutch member space varies from a wider portion to a narrower portion. A clutch member is disposed in the clutch member space so that (i) relative rotation between the internal rotary member and the external rotary member is inhibited when the clutch member is disposed in the narrower portion of the clutch member space; and (ii) relative rotation between the internal rotary member and the external rotary member is allowed when the clutch member is disposed in the wider portion of the clutch member space. A clutch member support is provided for supporting the clutch member within the clutch member space, and a coupling member is provided for increasing a coupling force between the clutch member support and one of the internal rotary member or external rotary member when the clutch rotates in a drive direction.

In a more specific embodiment, a plurality of such clutch member spaces are provided for accommodating a corresponding plurality of clutch members, and the clutch members comprise rolling members. Either the outer surface of the internal rotary member or the inner surface of the outer rotary member (or both) may be shaped to define the clutch member spaces. The coupling member may be a spring wound about either the outer surface of the internal rotary member or the inner surface of the external rotary member, wherein one end of the spring is fixed to the clutch member support, or else the coupling member may comprise a pawl disposed between the clutch member support and the internal rotary member. Of course, other configurations and components are possible.

DETAILED DESCRIPTION OF THE EMBODIMENTS

Figure 1:
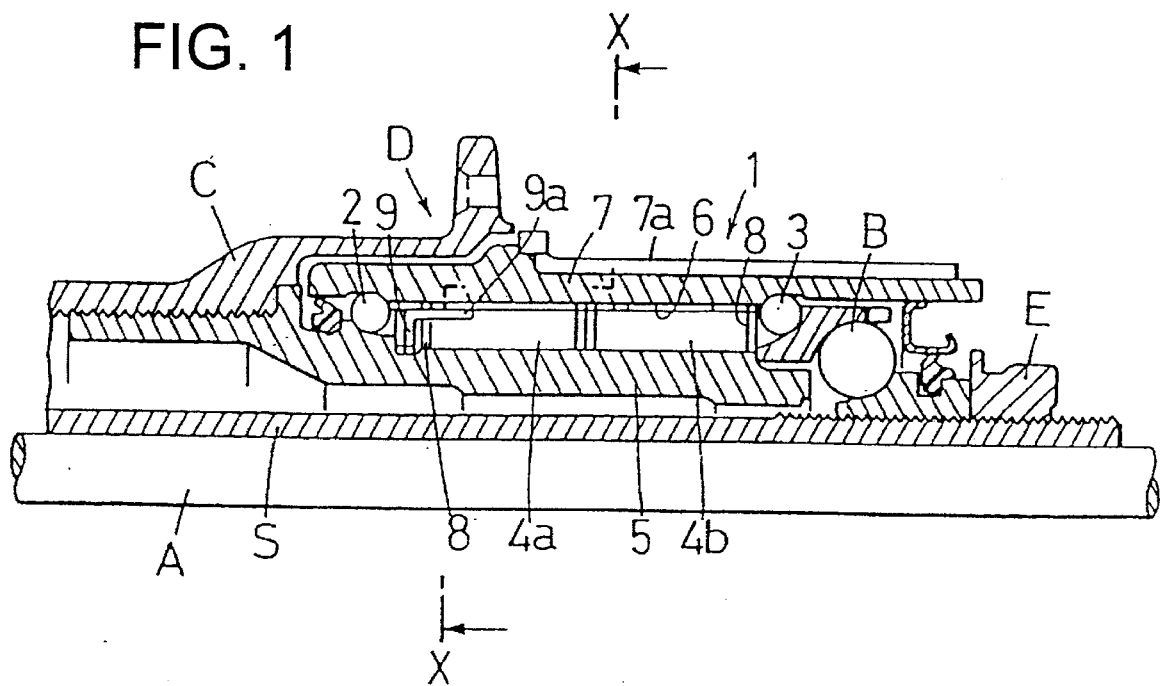
FIG. 1 is a partial cross-sectional view of a particular embodiment of a one-way clutch according to the present invention.
Figure 2:
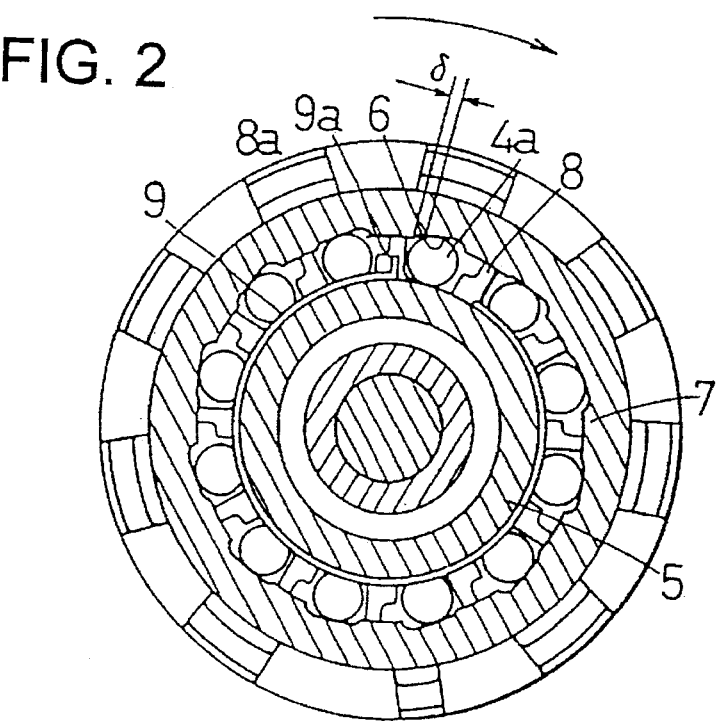
FIG. 2 is a cross-sectional view taken along line X—X in FIG. 1.

FIG. 1 is a partial cross-sectional view along the axial direction of the bicycle roller clutch illustrating a first embodiment of the present invention, and FIG. 2 is a cross-sectional view along the X—X line in FIG. 1. In FIG. 1, D is the rear hub of a bicycle. This rear hub D comprises a hub shaft A fixed at both ends to the frame of the bicycle (not shown), a hub barrel C rotatably supported via a pair of balls B in a sleeve S fitted into said hub shaft A, and other components of known construction. Reference numeral 1 denotes a bicycle roller clutch. This bicycle roller clutch 1 is equipped with a cone 5 that extends in the axial direction from threads that are threaded to one end around the inside of the hub barrel C, and a cup 7 that is rotatably supported via balls 2 and 3 around the outside of this cone 5. A sprocket, which is meshed with a chain that transmits the rotational drive force from the pedals (not shown), is attached around the outside of the cup 7. Around the outside of the cup 7 are made splines 7a that are used to engage the sprocket.

More specifically, the bicycle roller clutch 1 comprises a cone 5 in which a plurality of rollers 4a and 4b are in rolling contact around the outside surface in a plurality of rows (two rows in this practical example); a cup 7 which has a raceway track formed around the inside corresponding to the arrangement of the above-mentioned rollers 4a and 4b, and whose radius is successively increased from the center in the circumferential direction in order for the above-mentioned rollers 4a and 4b to be in rolling contact with the outside surface; roller supports (hereinafter referred to as cages) 8 that support the above-mentioned rollers 4a and 4b at equidistant spacing; and frictional force imparting means (hereinafter referred to as a winding spring) 9 for increasing the fictional force between these cages 8 and the cone 5 during rotation in the drive direction.

In this case, the winding spring 9 is moved from the axial direction, the bent end 9a of the winding spring 9 is inserted and hooked into a slit 8a formed in a cage 8, and when the winding spring 9 is wrapped around the outside of the cone 5 and made to slide in contact therewith, it imparts a fictional force between the cone 5 and the cages 8. The winding spring 9 allows the spring force of the compressed coil spring (not shown) that presses against and biases the individual rollers 4a and 4b to be reduced, and allows the increase in rotational torque during the freewheeling of the cup 7 to be suppressed and thus chain drag to be prevented. The winding spring 9 in this practical example is in the form of a flat spring, but may also be a linear coil spring. As long as it is an elastic body, it is not limited to a rectangular cross sectional shape.

When the cone 5 is in a stationary state and a rotational drive force is imparted in the direction shown by the arrow via a chain and sprocket to the cup 7 shown in FIG. 2, the rotation of this cup 7 causes the rollers 4a and 4b inside the grooves 6 to move in the shallow groove direction away from the rotational direction of the cup 7 (in the direction of lock). As a result, the rollers 4a and 4b stop at a specific position between the cup 7 and the cone 5 due to the fictional force between them and the bottom of the grooves 6. As shown in FIG. 2, there is a gap (referred to here as the interference δ) between the position where the rollers 4a and 4b housed inside the grooves 6 lightly come into contact with the slanted surface of the bottom of the groove 6 and stop and the end of the shallow side of these grooves 6.

If the cup 7 is further driven in the above-mentioned drive direction in this state, the rollers 4a and 4b will rotate between the cup 7 and the cone 5 and attempt to move with the cup 7. However, since these rollers 4a and 4b are integrally linked with the cages 8, they do not move relative to the cone 5 even though they try to move along with the cup 7. The reason for this is that the cages 8 are engaged with the cone 5 by means of the winding spring 9, and the movement of these cages 8 is in the direction in which the winding spring 9 closes, so the resistance is great and no relative movement with the cone 5 occurs. Therefore, the cages 8 supporting the rollers 4a and 4b are integrated with the cone 5 by the frictional force of the winding spring 9.

Consequently, the rollers 4a and 4b move by at least the amount of interference δ in the shallow groove direction inside the grooves 6 as a result of the frictional force with the winding spring 9 and of the action of weak compressed springs (not shown) that bias the individual rollers 4a and 4b between them and the cages 8, the cup 7 and the cone 5 are locked by the wedge action with the slanted bottom of the grooves 6, and the drive force of the cup 7 can be reliably transmitted to the cone 5.

When the drive on the drive wheel side is halted and the cup 7 begins to freewheel (that is, in which only the cone 5 rotates by inertia in the drive direction of the cup 7), the frictional force of the winding spring 9 is not instantly released at the point of this transition, and the extra frictional force causes the rollers 4a and 4b to move in the deep groove direction in the grooves and to be unlocked from the wedge action. In this state, the cone 5 rotates in the direction opposite to the direction in which frictional force is imparted by the winding spring 9, so the rotation of the cone 5 is not transmitted to the cup 7 side, and the cup 7 side is kept freewheeling, which prevents chain drag.

Figure 3:
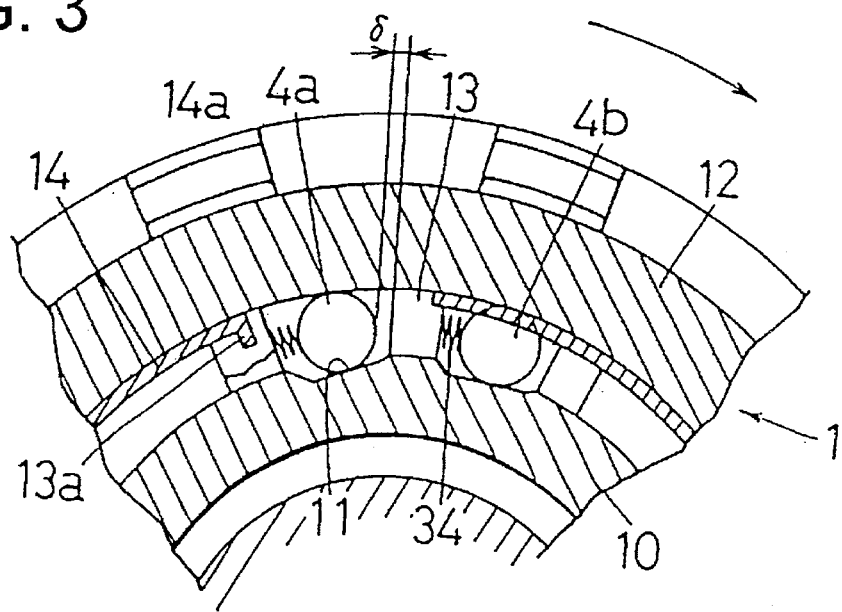
FIG. 3 is a partial cross-sectional view of an alternative embodiment of a one-way clutch according to the present invention.

FIG. 3 is a partial cross-sectional view of an alternative embodiment of a one-way clutch according to the present invention. Those structural components that are the same as in the above practical example are labelled with the same symbols, and their detailed description here will be omitted.

In this embodiment, the bicycle roller clutch 1 has a cup 12, around the inside surface of which a plurality of rollers 4a and 4b are in rolling contact; a cone 10, which has grooves 11 whose radius successively increases in the circumferential direction from the center in order for the rollers 4a and 4b to be in rolling contact around the outside surface, and which has a raceway track formed around the outside corresponding to the arrangement of the rollers 4a and 4b; cages 13 that support the rollers 4a and 4b at equidistant spacing; and a winding spring 14 (as the frictional force imparting means) that increases the frictional force between the cages 13 and the cup 12 during rotation in the drive direction.

When a rotational drive force is imparted to the cup 12 in the direction of the arrow, the rollers 4a and 4b inside the grooves 11 move through the grooves 11 in the shallow groove direction along with the rotation of the cup 12, and stop at specific positions with room left over (interference δ) as a result of frictional force with the bottom of the groove 11. When the rotation of the cup 12 is further continued, the frictional force produced between the cup 12 and the cages 13 as a result of the winding spring 14, one end of which has been inserted and hooked in a slit 13a of the cage 13, causes the cup 12 and the cages 13 to be integrated and to rotate relatively with respect to the stationary cone 10, and the stationary rollers 4a and 4b to move further in the shallow groove direction within the range of interference δ.

As a result of this movement, the rollers 4a and 4b are pressed and moved through the above-mentioned grooves 11 in the shallow groove direction by the weak spring force of a spring 34 that presses against and biases the individual rollers 4a and 4b with the cages 13, and the cup 12 and the cone 10 are locked as a result of the wedge action with the slanted bottom of the grooves 11, which allows the drive force of the cup 12 to be reliably transmitted to the cone 10.

Figure 4:
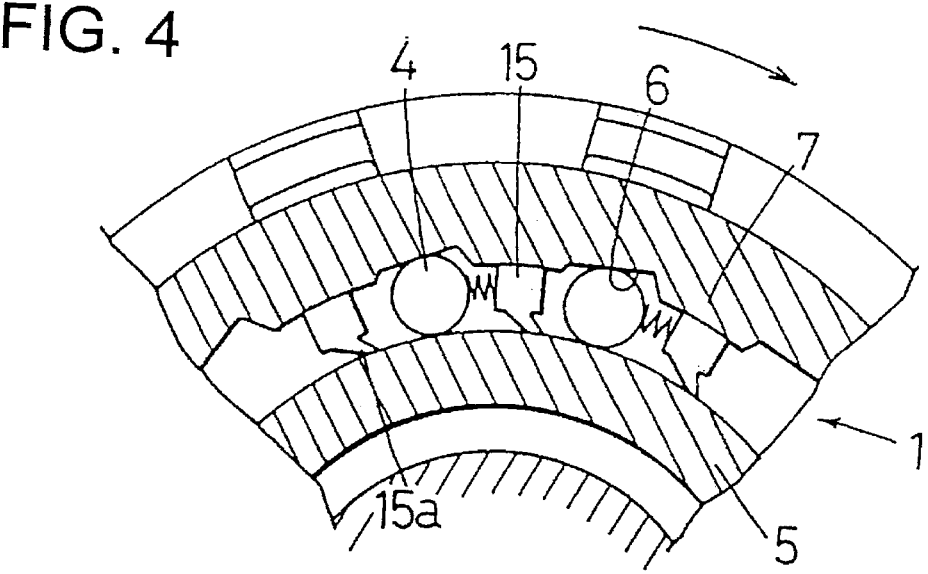
FIG. 4 is a partial cross-sectional view of another alternative embodiment of a one-way clutch according to the present invention.
Figure 5:
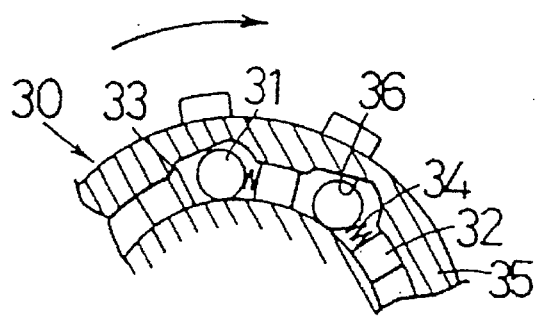
FIG. 5 is a partial cross-sectional view of a known one-way clutch.

FIG. 4 is another alternative embodiment of a one-way clutch according to the present invention. Once again, those structural components that are the same as in the above practical examples are labelled with the same symbols, and their derailed description here will be omitted.

In this embodiment, grooves 6 are formed around the inside surface of the cup 7. Rollers 4a and 4b supported by cages 15 are interposed between the cup 7 and the outside of the cone 5. The individually supported rollers 4a and 4b are pressed and biased in the shallow groove direction of the grooves 6 (in the direction of lock) by weak spring force. The cages 15 are such that pawls 15a that slant in the direction that the tips thereof dig in with respect to the drive direction of the cup 7 is formed on the contact surface across from the outside surface of the cone 5. The pawls 15a are made from an elastic material, and the tips of the pawls 15a are constantly biased so that they press against the outside surface of the cone 5. Thus, the pawls 15a are designed such that they have a frictional force imparting function that produces a frictional force with respect to the outside surface of the cone 5 when the drive force acts in the direction of the arrow of the cup 7. The pawls 15a of these cages 15 will, of course, produce a similar effect if they are provided to the contact surface across from the cup 7.

While the above is a description of various embodiments of the present invention, various modifications may be employed without departing from the spirit and scope of the invention. For example, the shape and configuration of the various elements may be altered in may ways, and components may be added or subtracted as the application requires. Thus, the scope of the invention should not be limited by the specific embodiments disclosed. Instead, the true scope of the invention should be determined by the following claims.

What is claimed is:

1. A one-way clutch comprising:

an internal rotary member;

an external rotary member;

wherein a surface of the internal rotary member and a surface of the external rotary member define a clutch member space so that a width of the clutch member space varies from a wider portion to a narrower portion, a clutch member disposed in the clutch member space so that:

(I) relative rotation between the internal rotary member and the external rotary member is inhibited when the clutch member is disposed in the narrower portion of the clutch member space; and (ii) relative rotation between the internal rotary member and the external rotary member is allowed when the clutch member is disposed in the wider portion of the clutch member space;

a clutch member support for supporting the clutch member within the clutch member space; and a coupling member for increasing a coupling force between the clutch member support and one of the internal rotary member or external rotary member when the clutch rotates in a drive direction and for decreasing the coupling force between the clutch member support and the one of the internal rotary member or external rotary member when the clutch rotates in an opposite direction.

2. A one-way clutch comprising:

an internal rotary member;

an external rotary member;

wherein a surface of the internal rotary member and a surface of the external rotary member define a plurality of clutch member spaces so that a width of each clutch member space varies from a wider portion to a narrower portion, a clutch member disposed in each clutch member space so that:

(I) relative rotation between the internal rotary member and the external rotary member is inhibited when the clutch member is disposed in the narrower portion of its corresponding clutch member space; and (ii) relative rotation between the internal rotary member and the external rotary member is allowed when the clutch member is disposed in the wider portion of its corresponding clutch member space;

clutch member supports for supporting the plurality of clutch member within the plurality of clutch member spaces; and a coupling member for increasing a coupling force between the clutch member supports and one of the internal rotary member or external rotary member when the clutch rotates in a drive direction and for decreasing the coupling force between the clutch member supports and the one of the internal rotary member or external rotary member when the clutch rotates in an opposite direction.

3. The one-way clutch according to claim 2 wherein the plurality of clutch members comprise a plurality of rolling members.

4. The one-way clutch according to claim 3 wherein the internal rotary member comprises a cone having an outer surface on which the clutch members are in rolling contact, and wherein the external rotary member comprises a cup having an inner surface defining the wider portion and the narrower portion of each clutch member space, and wherein the coupling member is disposed between the clutch member supports and the cone for increasing the coupling force between the clutch member supports and the cone when the clutch rotates in the drive direction.

5. The one-way clutch according to claim 4 wherein a radius from a center of the cup to the inner surface of the cup increases circumferentially in the driving direction within each clutch member space.

6. The one-way clutch according to claim 5 wherein the clutch member supports support the plurality of clutch members at equidistant spacing.

7. The one-way clutch according to claim 6 wherein the coupling member increases a fictional force between the clutch member supports and the cone when the clutch is rotating in a drive direction.

8. A one-way clutch comprising:

an internal rotary member;

an external rotary member;

wherein a surface of the internal rotary member and a surface of the external rotary member define a plurality of clutch member spaces so that a width of each clutch member space varies from a wider portion to a narrower portion, a clutch member disposed in each clutch member space so that:

(I) relative rotation between the internal rotary member and the external rotary member is inhibited when the clutch member is disposed in the narrower portion of its corresponding clutch member space; and (ii) relative rotation between the internal rotary member and the external rotary member is allowed when the clutch member is disposed in the wider portion of its corresponding clutch member space;

clutch member supports for supporting the plurality of clutch member within the plurality of clutch member spaces;

a coupling member for increasing a coupling force between the clutch member supports and one of the internal rotary member or external rotary member when the clutch rotates in a drive direction;

wherein the internal rotary member comprises a cone having an outer surface on which the clutch members are in rolling contact, and wherein the external rotary member comprises a cup having an inner surface defining the wider portion and the narrower portion of each clutch member space, and wherein the coupling member is disposed between the clutch member supports and the cone for increasing the coupling force between the clutch member supports and the cone when the clutch rotates in the drive direction; and wherein the coupling member comprises a first spring wound about the outer surface of the cone.

9. The one-way clutch according to claim 8 wherein the first spring has an end fixed to the clutch member supports.

10. The one-way clutch according to claim 9 further comprising a second spring disposed between each clutch member and its associated clutch member support for biasing each clutch member toward the narrower portion of its associated clutch space.

11. A one-way clutch comprising:

an internal rotary member;

an external rotary member;

wherein a surface of the internal rotary member and a surface of the external rotary member define a plurality of clutch member spaces so that a width of each clutch member space varies from a wider portion to a narrower portion, a clutch member disposed in each clutch member space so that:
(I) relative rotation between the internal rotary member and the external rotary member is inhibited when the clutch member is disposed in the narrower portion of its corresponding clutch member space; and
(ii) relative rotation between the internal rotary member and the external rotary member is allowed when the clutch member is disposed in the wider portion of its corresponding clutch member space;

clutch member supports for supporting the plurality of clutch member within the plurality of clutch member spaces;

a coupling member for increasing a coupling force between the clutch member supports and one of the internal rotary member or external rotary member when the clutch rotates in a drive direction;

wherein the internal rotary member comprises a cone having an outer surface on which the clutch members are in rolling contact, and wherein the external rotary member comprises a cup having an inner surface defining the wider portion and the narrower portion of each clutch member space, and wherein the coupling member is disposed between the clutch member supports and the cone for increasing the coupling force between the clutch member supports and the cone when the clutch rotates in the drive direction; and wherein the coupling member comprises a plurality of pawls disposed between the clutch member supports and the outer surface of the cone.

12. The one-way clutch according to claim 11 wherein each pawl comprises an elastic material.

13. The one-way clutch according to claim 3 wherein the external rotary member comprises a cup having an inner surface on which the clutch members are in rolling contact, and wherein the internal rotary member comprises a cone having an outer surface defining the wider portion and the narrower portion of each clutch member space, and wherein the coupling member is disposed between the clutch member supports and the cup for increasing the coupling force between the clutch member supports and the cup when the clutch rotates in the drive direction.

14. The one-way clutch according to claim 13 wherein a radius from a center of the cone to the outer surface of the cone decreases circumferentially in the driving direction within each clutch member space.

15. The one-way clutch according to claim 14 wherein the clutch member supports support the plurality of clutch members at equidistant spacing.

16. The one-way clutch according to claim 15 wherein the coupling member increases a frictional force between the clutch member supports and the cup when the clutch is rotating in a drive direction.

17. A one-way clutch comprising:
an internal rotary member;
an external rotary member;
wherein a surface of the internal rotary member and a surface of the external rotary member define a plurality of clutch member spaces so that a width of each clutch member space varies from a wider portion to a narrower portion, a clutch member disposed in each clutch member space so that:
(I) relative rotation between the internal rotary member and the external rotary member is inhibited when the clutch member is disposed in the narrower portion of its corresponding clutch member space; and
(ii) relative rotation between the internal rotary member and the external rotary member is allowed when the clutch member is disposed in the wider portion of its corresponding clutch member space;

clutch member supports for supporting the plurality of clutch member within the plurality of clutch member spaces;

a coupling member for increasing a coupling force between the clutch member supports and one of the internal rotary member or external rotary member when the clutch rotates in a drive direction;

wherein the external rotary member comprises a cup having an inner surface on which the clutch members are in rolling contact, and wherein the internal rotary member comprises a cone having an outer surface defining the wider portion and the narrower portion of each clutch member space, and wherein the coupling member is disposed between the clutch member supports and the cup for increasing the coupling force between the clutch member supports and the cup when the clutch rotates in the drive direction; and wherein the coupling member comprises a first spring wound about the inner surface of the cup.

18. The one-way clutch according to claim 17 wherein the first spring has an end fixed to the clutch member supports.

19. The one-way clutch according to claim 18 further comprising a second spring disposed between each clutch member and its associated clutch member support for biasing each clutch member toward the narrower portion of its associated clutch space.

20. A bicycle roller clutch comprising:
a plurality of rollers;
a cone fixed to a hub barrel;
an cup rotatably supported on the cone;
wherein an outer surface of the cone and an inner surface of the cup define a plurality of clutch member spaces so that a width of each clutch member space varies from a wider portion to a narrower portion;
wherein at least one of the plurality of rollers is disposed in each clutch member space so that:
(I) relative rotation between the cup and the cone is inhibited when the roller is disposed in the narrower portion of its corresponding clutch member space; and
(ii) relative rotation between the cup and the cone is allowed when the roller is disposed in the wider portion of its corresponding clutch member space;
roller supports for supporting the plurality of rollers at equidistant spacing; and
a coupling member for increasing a coupling force between the roller supports and one of the cup or cone when the clutch rotates in a drive direction and for decreasing the coupling force between the roller supports and the one of the cup or cone when the clutch rotates in an opposite direction.

* * * * *